(12) United States Patent
Takabayashi et al.

(10) Patent No.: US 7,494,212 B2
(45) Date of Patent: Feb. 24, 2009

(54) ACTIVATED LIGHT CURABLE INKJET INK AND IMAGE FORMATION METHOD

(75) Inventors: Toshiyuki Takabayashi, Hachioji (JP); Rieka Sekiguchi, Machida (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 430 days.

(21) Appl. No.: 11/218,571

(22) Filed: Sep. 6, 2005

(65) Prior Publication Data
US 2006/0050121 A1    Mar. 9, 2006

(30) Foreign Application Priority Data
Sep. 9, 2004    (JP) .............................. 2004-262133

(51) Int. Cl.
C09D 11/00    (2006.01)

(52) U.S. Cl. .................................. 347/100; 106/31.13

(58) Field of Classification Search .................. 347/100
See application file for complete search history.

(56) References Cited

U.S. PATENT DOCUMENTS

| | | | |
|---|---|---|---|
| 6,114,406 A | | 9/2000 | Caiger et al. |
| 6,145,979 A | | 11/2000 | Caiger et al. |
| 6,443,555 B1 | * | 9/2002 | Silverbrook et al. .......... 347/42 |
| 2004/0024091 A1 | | 2/2004 | Yamada et al. |
| 2004/0052968 A1 | * | 3/2004 | Takabayashi ................ 427/511 |
| 2004/0080595 A1 | * | 4/2004 | Taguchi et al. ............... 347/100 |

FOREIGN PATENT DOCUMENTS

| | | |
|---|---|---|
| EP | 1 388 578 A1 | 2/2004 |
| JP | 60132767 | 7/1985 |
| JP | 6009714 | 1/1994 |
| JP | 6200204 | 7/1994 |
| JP | 2000-504778 | 4/2000 |
| JP | 2001-031892 | 2/2001 |
| JP | 2001-040068 | 2/2001 |
| JP | 2001-055507 | 2/2001 |
| JP | 2001-220526 | 8/2001 |
| JP | 2001-220526 A | 8/2001 |
| JP | 2001-310937 | 11/2001 |
| JP | 2001-310938 | 11/2001 |
| JP | 2002-188025 | 7/2002 |
| JP | 2002-317139 | 10/2002 |
| JP | 2003-147233 | 5/2003 |
| JP | 2003-147233 A | 5/2003 |
| JP | 2003-253155 A | 9/2003 |
| JP | 2004-182933 A | 7/2004 |
| JP | 2004-315685 A | 11/2004 |
| JP | 2005-154679 A | 6/2005 |

OTHER PUBLICATIONS

Extended European Search Report for corresponding EP Application No. EP 05781276.0, dated Aug. 11, 2008.

* cited by examiner

Primary Examiner—Manish S Shah
Assistant Examiner—Laura E Martin
(74) Attorney, Agent, or Firm—Finnegan, Henderson, Farabow, Garrett & Dunner, L.L.P.

(57) ABSTRACT

An activated light curable inkjet ink including: a photo-initiator, photo-polymerizable compound dispersant and modified silicone oil, wherein, when 0.1 percent by mass of the modified silicone oil is added to said activated light curable inkjet ink containing no modified silicone oil, a surface tension at 25° C. is reduced by 0 through 3 mN/m.

7 Claims, 2 Drawing Sheets

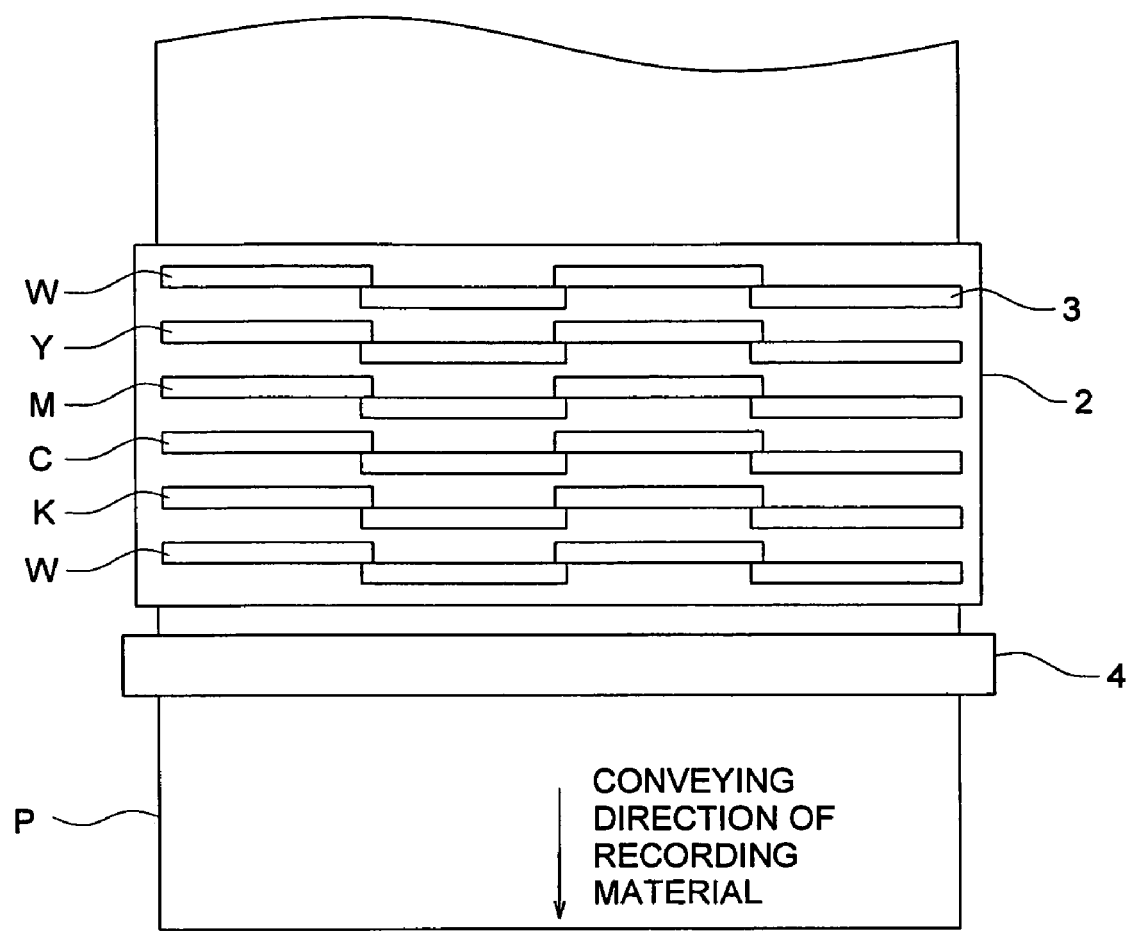

ACTIVATED LIGHT CURABLE INKJET INK AND IMAGE FORMATION METHOD

This application is based on Japanese Patent Application No. 2004-262133 filed on Sep. 9, 2004, in Japanese Patent Office, the entire content of which is hereby incorporated by reference.

TECHNICAL FIELD

The present invention relates to an activated light curable inkjet ink capable of providing stable reproduction of a high-definition image on various recording media in various printing environments, and an image formation method and inkjet recording apparatus based on this ink.

BACKGROUND

In recent years, the inkjet recording method provides a handy and cost-effective way of producing an image, and has been extensively employed over an extensive range including photographing, various forms of printing, marking, special printing on color filters. In particular, this technique provides image quality comparable to that of silver halide photography, using a recording apparatus for jetting minute dots and controlling them; an ink characterized by improved color reproduction range, durability and jetting suitability; and special-purpose paper accompanied by a drastic enhancement in ink absorption, good color development, coloring material and surface gloss. The current enhancement of image quality by the inkjet recording method is achieved only when all of the three factors—recording apparatus, and ink and special-purpose paper—have been upgraded.

However, an inkjet system requiring use of special-purpose paper encounters such problems as restrictions on the recording medium and overruns of the recording medium cost. To solve these problems, numerous attempts have been made to use the inkjet method to record on a transfer medium different from special-purpose paper. To put it more specifically, such techniques include the phase-change inkjet method for using a solid wax ink at room temperature, the solvent-based inkjet method using an ink mainly composed of quick-drying organic solvent, and the UV inkjet method that uses ultraviolet rays (UV) for cross linking.

Of these techniques, the UV inkjet method is less foul smelling and dries more quickly than the solvent based inkjet method, and permits recording on paper that does not absorb ink. For these reasons, the UV inkjet method is drawing attention, and ultraviolet cure ink for inkjets have been disclosed (e.g., Patent Documents 1 and 2).

However, even when such ink is used, stable emission of ink may not be achieved, depending on the type of the recording medium and working environment. Further, there is a great change in the diameter of the dots having been emitted, and a high-definition image cannot be formed on various recording media, according to the prior art.

In particular, the ink for ultraviolet cure inkjet using cation polymerized compounds is not subjected to oxygen inhibition, but is vulnerable to the adverse effect of the water content (moisture) on the molecular level (e.g., Patent Documents 3 through 5).

The activated light curable inkjet ink containing the modified silicone oil has been known in the prior art (e.g., Patent Document 6). The modified silicone oil used in such a technique causes drastic reduction in the surface tension of ink. Thus, the prior art has failed to ensure both stable ink emission and high-definition image formation in various printing environments.

[Patent Document 1] Official Gazette of Japanese Patent Tokuhyo 6-200204 (Claim and Embodiment)
[Patent Document 2] Official Gazette of Japanese Patent Tokkai 2000-504778 (Claim and Embodiment)
[Patent Document 3] Official Gazette of Japanese Patent Tokkai 2001-220526 (Claim and Embodiment)
[Patent Document 4] Official Gazette of Japanese Patent Tokkai 2002-188025 (Claim and Embodiment)
[Patent Document 5] Official Gazette of Japanese Patent Tokkai 2002-317139 (Claim and Embodiment)
[Patent Document 6] Official Gazette of Japanese Patent Tokkai 2003-147233 (Claim and Embodiment)

The present invention is intended to solve the aforementioned problems. It is accordingly an object of this invention to provide an activated light curable inkjet ink capable of ensuring stable ink emission, excellent character quality without color mixture, and stable recording of high-definition images in various printing environments, and to provide as an image formation method and inkjet recording apparatus using this activated light curable inkjet ink.

SUMMARY

One aspect of the present invention is found in the structure described below:

An activated light curable inkjet ink including:
a photo-initiator, photo-polymerizable compound dispersant and modified silicone oil,
wherein, when 0.1 percent by mass of the modified silicone oil is added to said activated light curable inkjet ink containing no modified silicone oil, a surface tension at 25° C. is reduced by 0 through 3 mN/m.

An image formation method comprising the steps of:
printing on a recording medium by jetting said activated light curable inkjet ink onto the recording medium from an inkjet recording head; and
applying activated light 0.001 through 2.0 sec. after arrival of said activated light curable inkjet ink.

Thus, the present invention provides an activated light curable inkjet ink capable of ensuring stable ink emission, excellent character quality without color mixture, and stable recording of high-definition images in various printing environments. It also provides as an image formation method and inkjet recording apparatus using this activated light curable inkjet ink.

BRIEF DESCRIPTION OF THE DRAWINGS

FIG. 2 is a top view of another example of the structure of the major portions of an inkjet recording apparatus of the present invention.

DESCRIPTION OF THE PREFERRED EMBODIMENTS

Figure 1:
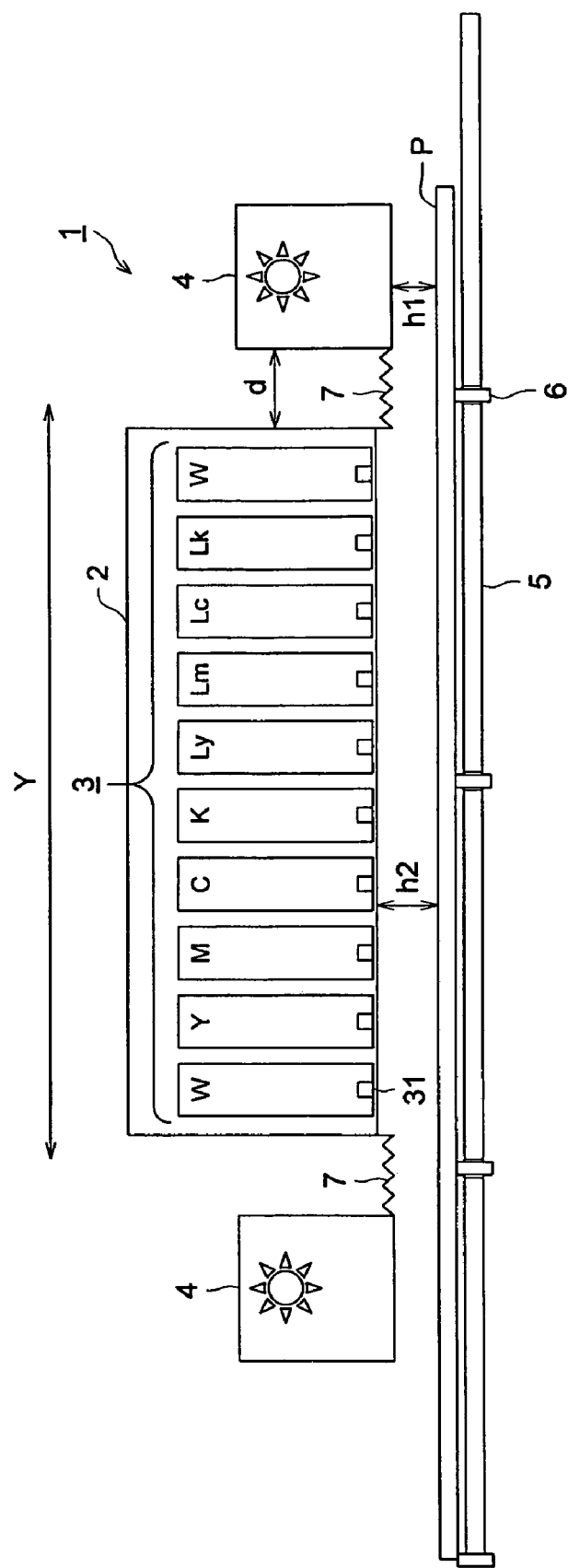
FIG. 1 is a front view showing an example of the structure of the major portions of an inkjet recording apparatus of the present invention.

The following describes the details of the present invention: The present inventors have found out that a drastic improvement in emission stability and curing performance is provided, and excellent emission stability and curing performance independently of curing environments (temperature and humidity) are achieved, if the activated light curable inkjet ink (also called "ink" for simplicity) is impregnated with 0.1 percent by mass of modified silicone oil wherein the surface tension at 25° C. is reduced by 0 through 3 mN/m. This finding has led to the present invention.

The activated light curable inkjet ink containing the modified silicone oil has been known in the prior art, and a modified silicone oil for causing a drastic reduction in the surface tension of ink in all the techniques known so far, so that stable ink emission and high-definition images formation in various printing environments have been incompatible with each other. The structure according to the present invention is the first proposal for ensuring stable ink emission and control of the dot diameter subsequent to arrival of the ink to the recording medium.

Especially when a compound containing an oxirane group is used as a photo-polymerizable compound, emission stability is improved. Further, emission stability is upgraded and dot diameter control is facilitated when 30 through 95 percent by mass of a compound having an oxetane ring, 5 through 70 percent by mass of oxirane group, and 0 through 40 percent by mass of vinylether compound are contained as the photo-polymerizable compounds.

The modified silicone oil of the present invention will be described. Reduction of the surface tension of ink is 0 through 3 mN/m at 25° C. when 0.1 percent by mass of the modified silicone oil of the present invention is contained in ink with respect to 100 percent by mass of modified silicone oil. If reduction of the surface tension of ink is greater than 3 mN/m, emission stability and dot diameter control will be incompatible with each other.

Specific examples include the SDX-1843 by Asahi Denka Kogyo K.K. (polyether modified silicone) and XF42-334 by G.E. Toshiba Silicone Inc. (alkylaralkyl modified silicone oil). For example, 0.1 percent by mass of these substance is contained with respect to 100 percent by mass of general epoxy compound (Ceroxide 2021P by Daicel Chemical Industries, Ltd.) or oxetane compound (OXT-221 by Toa Gosei Co., Ltd.), reduction in surface tension is less than 0.5 mN/m.

The amount of modified silicone oil to be added is preferably 0.01 through 1.0 percent by mass with respect to 100 percent by mass of ink compositions. If it is less than 0.01 percent by mass, the advantages will be reduced. If it is more than 1.0 percent by mass, emission stability will be reduced.

In the present invention, to improve curing performance and ink emission stability, at least one compound containing an oxirane group is preferably included as a photo-polymerizable compound.

Various forms of cation polymerizable monomer known in the prior art can be used as a photo-polymerizable compound. For example, it is possible to utilize the epoxy compound, vinyl ether compound and oxetane group disclosed in Japanese Patent Tokkaihei 6-9714, Japanese Patent Tokkai 2001-31892, Japanese Patent Tokkai 2001-40068, Japanese Patent Tokkai 2001-55507, Japanese Patent Tokkai 2001-310938, Japanese Patent Tokkai 2001-310937, and Japanese Patent Tokkai 2001-220526.

The epoxy compound includes the aromatic epoxide, alicyclic epoxide, and aliphatic epoxy introduced below:

Preferred aromatic epoxide is exemplified by di- or poly-glycidyl ether produced by reaction between polyvalent phenol having at least one aromatic nucleus or the alkylene oxide adduct thereof and epichlorhydrin. For example, it includes di- or poly-glycidyl ether of bisphenol A or alkylene oxide adduct thereof, hydrogenated bisphenol A or alkylene oxide adduct thereof, and novolak type epoxy resin.

Alkylen oxide includes ethylene oxide, propylene oxide, etc.

The preferred alicyclic epoxide is the compound containing the cyclohexane oxide or cyclopentene oxide obtained by epoxidization of the compound containing at least one cycloalkane ring such as cyclohexane or cyclopentene ring, using hydrogen peroxide and peroxy acid.

The preferred aliphatic epoxide includes di- or poly-glycidyl ether of aliphatic polyvalent alcohol or alkylene oxide adduct. It is represented by:

diglycidyl ether of alkylene glycol such as diglycidyl ether of ethylene glycol, diglycidyl ether of propylene glycol or diglycidyl ether of 1,6-hexanediol;

polyglycidyl ether of polyvalent alcohol such as di- or tri-glycidyl ether of glycerine or alkylene oxide adduct;

diglycidyl ether of polyethylene glycol or alkylene oxide adduct thereof; and diglycidyl ether of polyalkylene glycol such as diglycidyl ether of polypropylene glycol or alkylene oxide adduct thereof. In this case, the examples of alkylene oxide are ethylene oxide and propylene oxide.

Of the aforementioned epoxide, aromatic epoxide and alicyclic epoxide are preferred when consideration is given to quick curing performance. Especially the alicyclic epoxide is preferably utilized. In the present invention, one of the aforementioned epoxides can be used independently, or two or more can be used in combination as appropriate.

In the present invention, from the viewpoint of ensuring safety such as AMES and sensitizing performances, an epoxide compound containing an oxirane group is preferably either the epoxidized fatty acid ester or deoxidized fatty acid glyceride.

The epoxidized fatty acid ester and epoxidized fatty acid glyceride are subjected to any restriction if they are produced by introducing an epoxy group into the fatty oil ester and fatty oil glyceride. The epoxidized fatty acid ester is produced by epoxidizing the oleic acid ester, and epoxy methyl stearate, epoxy butyl stearate and epoxy octyl stearate are employed as epoxidized fatty acid ester. Similarly, the epoxidized fatty acid glyceride is produced by epoxidizing the soybean oil, linseed oil and castor oil. Epoxidized soybean oil, epoxidized linseed oil and epoxidized castor oil are used as the epoxidized fatty acid glyceride.

In the present invention, for further improvement of the curing performance and ink emission stability, 30 through 95 percent by mass of compound containing an oxetane ring, 5 through 70 percent by mass of compound containing an oxirane ring and 0 through 40 percent by mass of vinyl ether compound are preferably contained in the photo-polymerizable compound.

The oxetane compound known in the prior art, as disclosed in the Japanese Patents Tokkai 2001-220526 and 2001-310937 can be used as the oxetane compound that can be used in the present invention.

Examples of the vinyl ether compound that can be used in the present invention include:

di- or tri-vinylether compounds such as ethyleneglycol divinylether, diethylene glycol divinylether, triethylene glycol divinylether, propylene glycol divinylether, dipropylene glycol divinylether, butane diol vinylether, hexane diol divinylether, cyclohexane dimethanol divinylether and trimethyrol propane trivinylether; and monovinylether compounds such as ethyl vinylether, n-butylvinylether, isobutylvinylether, octadesylvinylether, cyclohexylvinylether, hydroxybutylvinylether, 2-ethylhexylvinylether, cyclohexane dimethanol monovinylether, n-propylvinylether, isopropyl vinylether, isopropenyl ether-O-propylene carbonate, dodesylvinylether, diethylene glycol monovinylether and octadesyl vinylether.

Of these vinylether compounds, the di- or tri-vinylether compound or divinylether compound in particular is preferred when consideration is given to curing performance, degree of adhesion and surface hardness. In the present invention, one of the aforementioned vinylether compound can be used independently, or two or more can be used in combination as appropriate.

In the present invention, a radical polymerizable compound can also be used. The radical polymerizable compound is exemplified by (metha)acrylate monomer and oligomer known in the prior art.

The examples include:

monofunctional monomers such as isoamylacrylate, stearylacrylate, laurylacrylate, octylacrylate, desylacrylate, isomyristylacrylate, isostearylacrylate, 2-ethylhexyl-di-glycol acrylate, 2-hydroxybutylacrylate, 2-hydroxybutylacrylate, 2-acryloyloxyethylhexahydrophthalate, butoxyethylacrylate, ethoxydiethylene glycol acrylate, methoxydiethylene glycol acrylate, methoxypolyethylene glycol acrylate, methoxypropylene glycol acrylate, phenoxyethylacrylate, tetrahydrofurfurylacrylate, isobonylacrylate, 2-hydroxyethylacrylate, 2-hydroxypropylacrylate, 2-hydroxy-3-phenoxypropylacrylate, 2-acryloyloxyethyl succinate, 2-acryloyloxyethyl phthalate, 2-acryloyloxyethyl-2-hydroxyethyl phthalate, lactone modified flexible acrylate, and t-butylcyclohexylacrylate;

difunctional monomers such as triethylene glycol acrylate, tetraethylene glycol diacrylate, polyethylene glycol diacrylate, tripropylene glycol diacrylate, polypropylene glycol diacrylate, 1,4-butanedioldiacrylate, 1,6-hexanedioldiacrylate, 1,9-nonane dioldiacrylate, neopentyl glycol diacrylate, dimethylol-tricyclodecane diacrylate, EO adduct of bisphenol A, PO adduct diacrylate of bisphenol A, hydroxy pivalate neopentyl glycol diacrylate, and polytetramethylene glycol diacrylate; and multifunctional monomers such as trimethylolpropane triacrylate, EO modified trimethylolpropane triacrylate, penta-erithritol triacrylate, penta-erithritol tetraacrylate, dipenta-erithritol hexaacrylate, ditrimethylolpropane tereraacrylate, glycerinepropoxy triacrylate, caprolactone modified trimethylolpropane triacrylate, penta-erithritoletoxy tetraacrylate, and caprolactone modified dipenta-erithritol hexaaacrylate.

Any of the photo-initiators known in the prior art can be used with the activated light curable inkjet ink of the present invention. The photo-initiator includes a photo-oxygen generator and photo radical generator.

The photo-oxygen generator is exemplified by a chemical amplified photo-resist and the compound used in photo cation polymerization ("Organic Material for Imaging" complied by the Organic Electronics Material Research Institute, Bunshin Publishing Co., Ltd., (1993) pp. 187-192). The following shows the compounds preferred in the present invention:

The first examples are $B(C_6F_5)_4^-$, $PF_6^-$, $AsF_6^-$, $SbF_6^-$ and $CR_3SO_3^-$ salts as aromatic onium compounds such as diazonium, ammonium, iodonium, sulfonium and phosphonium.

Examples of the onium compounds that can be used in the present invention will be shown below:

[Chemical Formula 1]

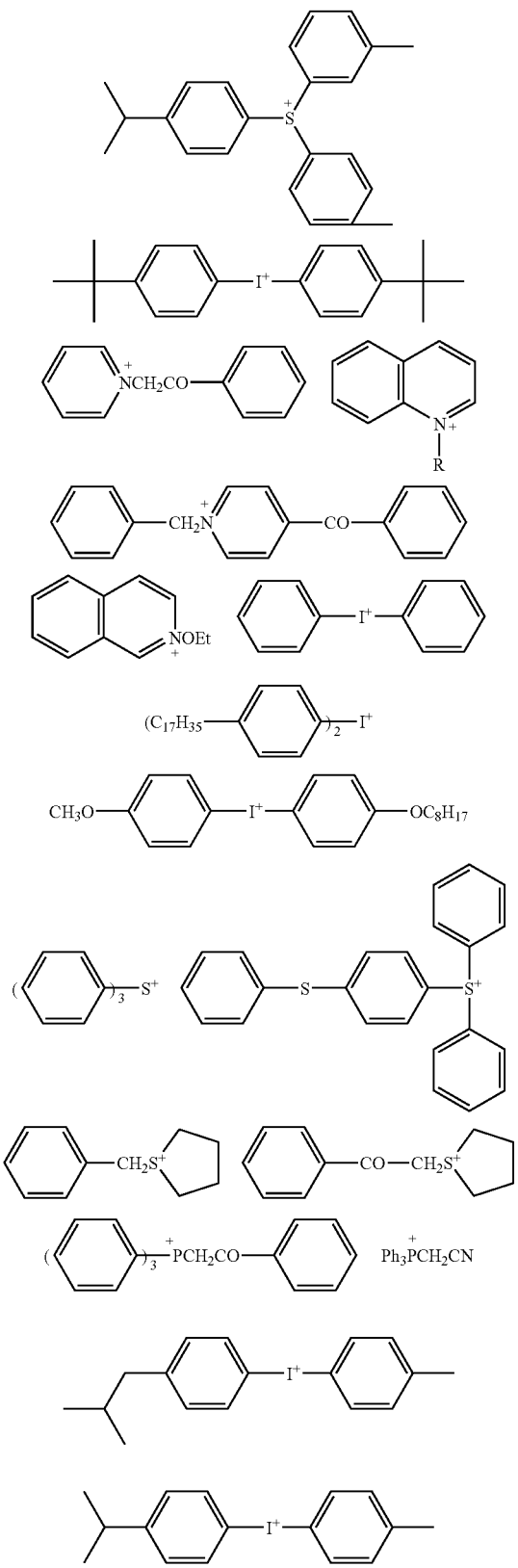

The second example is the sulfone compound that generates a sulfonic acid.

[Chemical Formula 2]

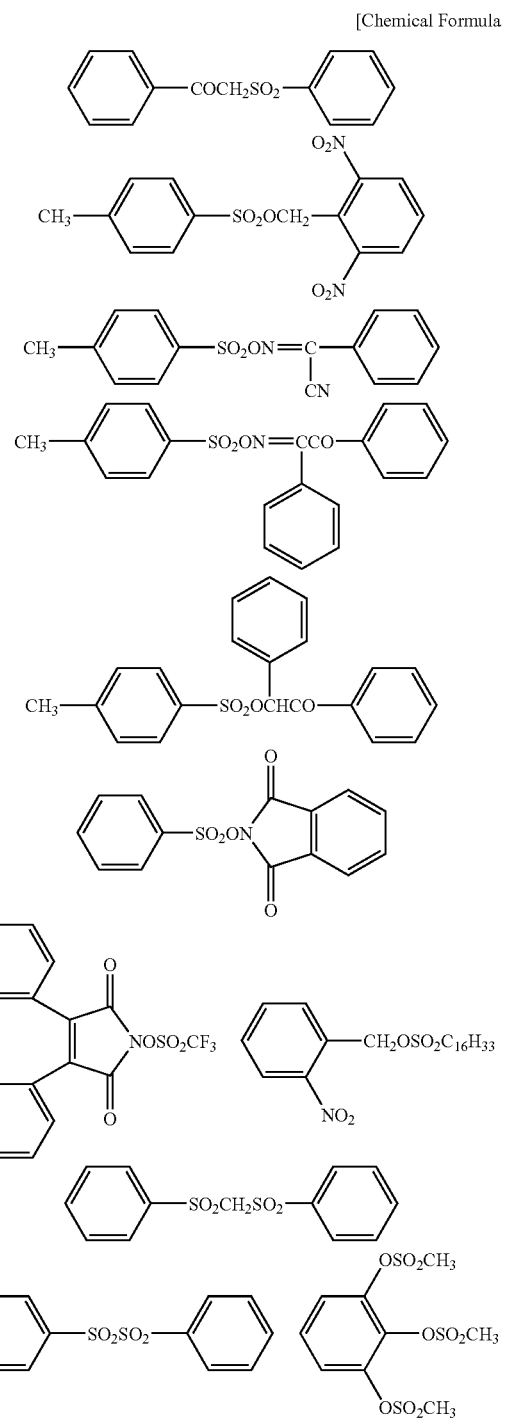

The third example is the halogen compound that generates halogenated hydrogen by photoirradiation.

[Chemical Formula 3]

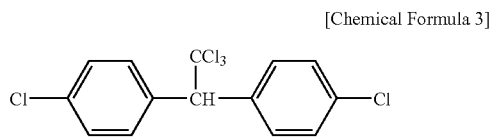

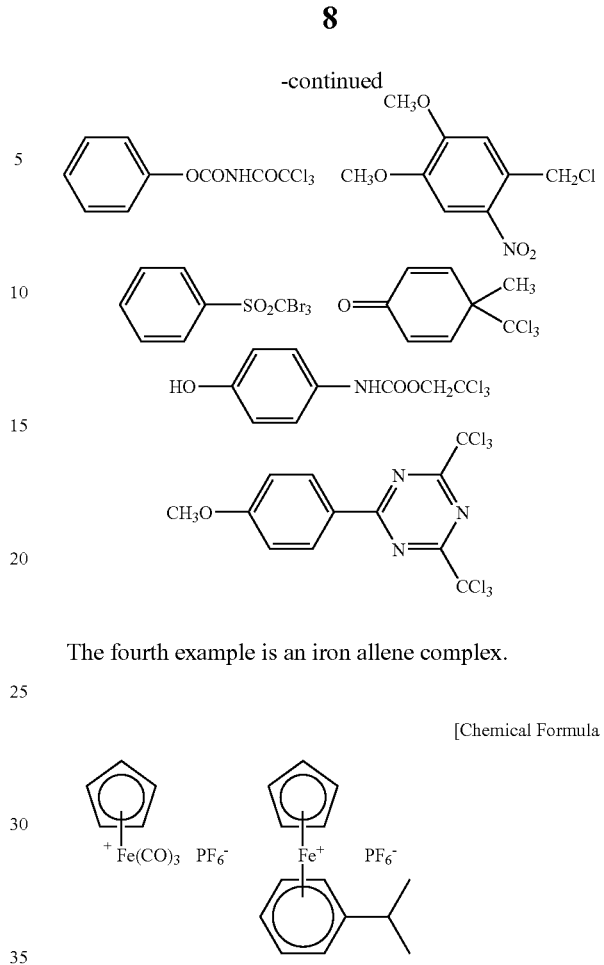

The fourth example is an iron allene complex.

[Chemical Formula 4]

The photo-radical generator used in the present invention includes photo radical generator known in the prior art, such as aryl alkyl ketone, oxime ketone, thiobenzoic acid S phenyl, titanocene, aromatic ketone, thioxanthone, benzyl, quinone derivative and ketocoumarin. For details, see "Application and Market for UV/EB Curing Technology" (C.M.C. Publishing Co., Ltd., Compiled by Supervised by Y. Tabata and Ladtec Research Institute). Of these substances, asylphosphine oxide and asylphosphonate are characterized by a high degree of sensitivity. Since absorption is reduced by photocleavage of the initiator, and this is effective for internal curing of the ink image having a thickness of 5 through 12 μm for each color, as in the case of the inkjet method. To put it more specifically, bis(2,4,6-trimettylbenzoyl)-phenylphosphine oxide, and bis(2,6-dimethoxybenzoyl)-2,4,4-trimethyl-pentylphosphine oxide are preferably used.

When the safety is taken into account at the time of selection, the preferably used examples are 1-hydroxy-cyclohexyl-phenyl-ketone, 2-methyl-1[4-(methylthio)phenyl]-2, morpholinopropane-1-on, bis(2,6-dimethoxybenzoyl)-2,4,4-trimethyl-pentylphosphine oxide, and 2-hydroxy-2-methyl-1-phenyl-propane-1-on (Darocure (registered tradename) 1173). The preferred amount to be added is 1 through 6 percent by mass, or more preferably 2 through 5 percent by mass, with respect to the entire amount of ink composition.

The activated light curable inkjet ink of the present invention contains various forms of dyes and/or pigments known in the prior art, together with the aforementioned activated light curable type compositions. It preferably contains pigments.

The following shows the pigments preferably used in the present invention:

C.I. Pigment Yellow-1, 3, 12, 13, 14, 17, 81, 83, 87, 95, 109, 42 and 138

C.I. Pigment Orange-16, 36 and 38

C.I. Pigment Red-5, 22, 38, 48: 1, 48: 2, 48: 4, 49: 1, 53: 1, 57: 1, 63: 1, 144, 146, 185, 101

C.I. Pigment Violet-19, 23

C.I. Pigment Blue-15: 1, 15: 3, 15: 4, 18, 60, 27, 29

C.I. Pigment Green-7, 36

C.I. Pigment White-6, 18, 21

C.I. Pigment Black-7

In the present invention, use of a white ink is preferred to improve the masking performance of the color on the transparent substrate like a plastic film. In particular, use of a white ink is preferred in soft package printing and label printing. However, since the amount of emission is increased, the amount of use is restricted automatically in order to ensure the aforementioned ink emission stability and to avoid curling or wrinkling of the recording medium.

A ball mill, sand mill, Atlighter, roll mill, agitator, Henschell mixer, colloid mill, ultrasonic homogenizer, purl mill, wet jet mill and paint shaker can be used for dispersion of the aforementioned pigments. A dispersant can be added at the time of dispersion of the aforementioned pigments. Use of a high molecular dispersant is preferred as a dispersant. Solsperse Series of Avecia Inc. A high molecular dispersant and PB series of Ajinomoto Finetechno Co., Ltd. can be mentioned as the high molecular dispersant. It is possible to use a synergist conforming to each pigment as a dispersant aid. 1 through 50 percent by mass of these dispersants and the aids thereof is preferably added with respect to 100 percent by mass. A solvent or polymerizable compound is used as the dispersant medium. In the exposure cure type ink used in the present invention, reaction and curing are carried out immediately after arrival of ink. So the dispersant medium is preferably of non-solvent type. If the solvent remains on the cured image, solvent resistance will deteriorate, and the VOC remaining solvent will cause a problem. Accordingly, the dispersant medium should be non-solvent. From the viewpoint of dispersion performance, use of a polymerizable compound—particularly a monomer of the lowest viscosity—is preferred.

For dispersion of the pigment, the average particle size of the pigment is preferably 0.08 through 0.5 µm. The pigment dispersant and dispersion medium are selected, and the dispersion conditions and filtering conditions are set in such a way that the maximum particle size will be 0.3 through 10 µm, preferably 0.3 through 3 µm. This particle size management minimizes the change of the head nozzle of being clogged, and ensures the ink storage stability, transparency and curing sensitivity.

The amount of the ink of the present invention is preferably 1 through 10 percent by mass of the entire ink as a coloring material In addition to the aforementioned substances, a great variety of additives can be added to the activated light curable inkjet ink of the present invention. For example, it is possible to add a surface active agent, leveling additive, matting agent, polyester resin for adjustment of film physical properties, polyurethane resin, vinyl resin, acryl resin, rubber resin and waxes. To improve the storage stability, any of the basic compounds known in the prior art can be used. They are represented by a basic alkaline metal compound, basic alkaline earth metal compound, and basic organic compound such as amine. Further, the radical polymerizable monomer is combined with the initiator to produce a hybrid cure ink of radical cation.

In the ink of the present invention, the viscosity at 25° C. is preferably 7 through 50 mPa·s in order to ensure stable ink emission and excellent curability, independently of the curing environment (temperature and humidity).

The recording medium usable in the present invention includes varieties of non-absorbing plastics and films thereof used in so-called soft package, in addition to the normal uncoated paper and coated paper. The examples of varieties of plastic films are a PET film, OPS film, OPP film, ONy film, PVC film, PE film and TAC film. Other films are polycarbonate, acryl resin, ABS, polyacetal, PVA and rubbers. Metals and glasses can also be used. The arrangement of the present invention is effective when an image is formed especially on the substances shrinkable by heat, such as the PET film, OPS film, OPP film, ONy film, PVC film out of the aforementioned recording materials. When these substrates are used, curling and deformation of the film are likely to occur due to ink curing shrinkage or heat generated at the time of curing reaction. Not only that, ink film does not easily conform to the shrinkage of ink film.

The surface energy varies greatly according to each type of plastic films. The dot diameter after having been emitted may change, depending on the recording medium. This has been a problem in the prior art. In the arrangement of the present invention, an image of high definition can be formed on the recording medium having a surface energy of 35 through 60 mN/m over an extensive range from the OPP film and OPS film having a lower surface energy to the PET film having a higher surface energy.

The Beck smoothness of non-coated paper is measured according to the test procedure designated in JIS P 8119. A flat plate having an effective area of 10 cm$^2$ is pressed against to the surface to be tested under a pressure of 9.8 N/cm$^2$. The Beck smoothness is expressed seconds when 10 ml of air flows under a pressure difference of approximately 49 kPa. To put it another way, the degree of matte is smaller as the value in terms of seconds is greater. Further, use of a pneumatic micrometer is preferred in order to measure the Beck smoothness with a higher accuracy than that of JIS P 8119. Especially, the Beck smoothness of excellent reproducibility can be easily obtained by using the Ohken smoothness measuring method specified in the J. TAPPI paper pulp test method No. 5 is preferably used (Yamamoto et al., Journal of Paper and Pulse Engineering Association, 20 [2], 17 through 24 (1966)). The Beck smoothness of the non-coated paper is generally 40 through 80 sec, or preferably 50 through 80 sec.

To get information on the surface roughness Rz of the non-coated paper, a non-contact 3D surface analyzer (RST/PLUS by WYKO Inc.) was used to measure the Rz of the area 368×238 µm.

The definition of the Rz used in this case is the same as that designated in the Surface Roughness (B0601) of the JIS shown below. Ten different positions were measured, and the average of these measurements was taken. Surface Roughness (B0601) of the JIS: Ten-point average roughness (Rz)

The ten-point average roughness (Rz) refers to the difference, expressed in terms of micrometers (µm), between:

the average of the elevations from the highest to the fifth highest peaks as measured in the direction of longitudinal magnification from the straight line, parallel to the average line, without crossing the cross sectional curve, in the portion obtained by extracting the reference length from the cross sectional curve; and the average of the elevations from the lowest to the fifth lowest.

In the present invention, the ten-point average roughness (Rz) used is 10 through 20 µm, preferably 13 through 18 µm.

In the present invention, use of a longer recording medium (web) is more advantageous from the viewpoint of the recording medium costs including the packaging cost and production cost, printing efficiency and compatibility with a wide variety of print sizes.

The following describes the image formation method of the present invention:

The image formation method preferred in the present invention is to jet the aforementioned ink onto a recording medium and to expose it according to the inkjet recording method, whereby activated light such as ultraviolet light is applied to cure the ink.

(Overall Ink Film Thickness After Arrival of Ink)

In the present invention, the thickness of the overall ink film is preferably 2 through 20 μm after the ink has been cured by application of activated light. For activated light curable inkjet recording in the field of screen printing, the overall ink thickness is greater than 20 μm. In the field of soft package printing where a thin plastic film is often used as the recording medium, there is a problem of the toughness and quality of the printed matter as a whole being changed, in addition to the aforementioned problem of curling and wrinkling of the recording medium. Thus, emission of ink resulting in excessive film thickness is not preferred.

The "overall ink film thickness" in the sense in which it is used here refers to the maximum value for the thickness of ink film exposed on a recording medium. The term "overall ink film thickness" has the same meaning, independently of whether inkjet recording is conducted in a single color mode, or in the two-, three- or four-color (white ink base) superimposition mode.

(Ink Emission Conditions)

The recording head and ink is heated up to 35 through 100° C., and ink is emitted. This is an ink emission condition preferred for the purpose of ensuring emission stability. The activated light curable inkjet ink is characterized by a wide range of fluctuation in viscosity resulting from temperature change, and the fluctuation in viscosity directly has a serious influence upon the ink particle size and ink particle jetting speed, thereby causing deterioration of image quality. This requires the ink temperature to be kept constant while being raised. The range of ink temperature control is ±5° C., preferably ±2° C., more preferably ±1° C., with respect to the setting.

In the present invention, the amount of ink particle emitted from the nozzle is preferably 2 through 15 pl.

To create a high definition image, the amount of ink particles should be within this range. If this amount of ink particle is emitted, a serious effect will be given to the aforementioned emission stability. Even if ink emission is carried out in a small amount of ink particles of 2 through 15 pl, the present invention ensures the emission stability to be improved and a stable high-definition image to be created.

(Light Application Conditions After Arrival of Ink)

In the image formation method of the present invention, activated light is preferably applied 0.001 through 2.0 sec., more preferably 0.001 through 1.0 sec., after arrival of ink after arrival of ink. To form a high-definition image, it is particularly important that light should be applied as early as possible.

One of the methods of applying activated light is disclosed in the Japanese Patent Tokkaisho 60-132767. According to this technique, a light source is arranged on each side of the heat unit, and the head and light sources can be scanned by a shuttle method. Light is applied some time after arrival of ink.

Further, curing is conducted by another light source that is not driven. U.S. Pat. No. 6,145,979 discloses the method of applying light, wherein a optical fiber is utilized. It also discloses the method of applying a collimated light source to a mirror surface arranged on the side of the head unit, whereby ultraviolet rays are applied to a recording section. In the image formation method of the present invention, these methods can be utilized.

Activated light is applied in two steps: 0.001 through 2.0 after arrival of the ink, activated light is applied according to the aforementioned method. Upon completion of the entire printing procedure, activated light is again applied. This is one of the preferred methods. Application of activated light in two separate steps more effectively reduces the possibility of shrinkage of the recording medium that may occur when ink is cured.

In the UV inkjet method according to the prior art, in order to minimize the expansion of dots and bleeding subsequent to arrival of ink, the light source of high illumination is normally used wherein the overall power consumption of the light source exceeds 1 kW·hr. However, use of such a light source has caused excessive shrinkage of a recording medium in printing on a shrink label or the like, and such a light source cannot be used in practice, according to the prior art.

By contrast, in the present invention, the activated light with the maximum illumination is preferably used in the wavelength range of 254 nm. The present invention allows a high-definition image to be created even if the light source having an overall power consumption of 1 kW·hr or more is used. Further, the shrinkage of a recording medium is kept within practically permissible level.

In the present invention, the overall power consumption of the light source is preferably less than 1 kW·hr. Examples of the power consumption being less than 1 kW·hr. include a fluorescent tube, cold-cathode tube and LED, without the prevent invention being restricted thereto.

The following describes the inkjet recording apparatus in the present invention (hereinafter referred to as "recording apparatus" for short).

Te recording apparatus of the present invention will be described with reference to drawings whenever required. The recording apparatus in the drawing represents only one embodiment of the present invention, without the recording apparatus invention being restricted thereto.

FIG. 1 is a front view showing the structure of the major portions of an recording apparatus of the present invention. The recording apparatus 1 comprises a head carriage 2, a recording head 3, an irradiation means 4 and a platen section 5. In the recording apparatus 1, a platen section 5 is arranged below the recording medium P. Having a function of absorbing the ultraviolet rays, the platen section 5 absorbs the excess ultraviolet rays having passed through the recording medium P, with the result that very stable reproduction of a high-definition image can be achieved.

The recording medium P is guided by the guide member 6, and is fed from the foreground to the background in FIG. 1 by the operation of the conveyance means (not illustrated). A head scanning means (not illustrated) caused reciprocating motion of the head carriage 2 in the Y direction in FIG. 1, whereby scanning of the recording head 3 held by the head carriage 2 is carried out.

The head carriage 2 is arranged above the recording medium P and accommodates a plurality of recording heads 3 (to be described later) arranged in response to the number of colors used for image printing on the recording medium P, wherein the recording heads 3 are placed with its ink outlet facing downward. The head carriage 2 is installed on the recording apparatus 1 proper so that it can freely reciprocate in the Y direction of FIG. 1. Driven by the head scanning means, the head carriage 2 performs a reciprocating motion in the Y direction of FIG. 1.

In FIG. 1, the head carriage 2 accommodates recording heads 3 for white (W), yellow (Y), magenta (M), cyan (C) and black (K), light yellow (Ly), light magenta (Lm), light cyan (Lc), light black (Lk) and white (W), whereby an image is formed. In practice, the number of the recording heads 3 accommodated in the head carriage 2 can be determined as appropriate.

In the recording head 3, the activated light curable inkjet ink (e.g., ultraviolet cure ink) supplied by an ink supply means (not illustrated) is emitted toward the recording medium P through the ink outlet by the operation of a plurality of ink emission means arranged inside. The ultraviolet cure ink emitted by the recording head 3 comprises a coloring material, a polymerizable monomer, an initiator and others. The initiator works as a catalyst when the ink is exposed to ultraviolet rays. This allows the ink to be cured by resultant cross-linking and polymerization of the monomer.

The recording head 3 emits the ultraviolet cure ink in the form of ink particles to a predetermined area (area where ink can reach) in the recording medium P during the scanning operation wherein the movement from one end of the recording medium P to the other end of the recording medium P in the Y direction of FIG. 1 is performed by the drive of a head scanning means. Thus the ink particles are emitted to the area where ink can reach.

The aforementioned scanning operations are performed several times, and the ultraviolet cure ink is emitted to the area that can be reached by ink in one area. After that, the recording medium P is moved as in FIG. 1. While the scanning is again performed by the head scanning means, the ultraviolet cure ink is emitted by the recording head 3 to the next adjacent reachable area in the background in FIG. 1, with respect to the aforementioned area that can be reached by ink.

The aforementioned operation is repeated, and the ultraviolet cure ink is emitted from the recording head 3 synchronously with the head scanning means and conveyance means, whereby an image composed of a collection of ultraviolet cure ink particles is formed on the recording medium P.

The irradiation means 4 comprises an ultraviolet ray lamp for emitting ultraviolet rays of a specific wavelength range with a stable exposure energy, and a filter for transmitting the ultraviolet rays of a specific wavelength. The aforementioned ultraviolet ray lamp that can be used includes a mercury lamp, metal halide lamp, excimer laser, ultraviolet ray laser, cold-cathode tube, black light, and LED (light emitting diode). The band-shaped metal halide lamp, cold-cathode tube, mercury lamp, or black light is preferably utilized. The low-voltage mercury lamp cold cathode tube, hot cathode tube and bactericidal lamp for emitting ultraviolet rays having a wavelength of 254 nm are effective in preventing bleeding and controlling the dot diameter, and are preferably used. If the black light is used as a radiation source of the irradiation means 4, the irradiation means 4 for curing the ultraviolet cure ink can be produced economically.

In the ink-reachable area where the recording head 3 emits ultraviolet cure ink by one scanning operation through the drive of the head scanning means, the irradiation means 4 has the same configuration as the maximum one that can be set by the recording apparatus 1 (UV inkjet printer), or a configuration greater than the area that can be reached by ink.

The irradiation means 4 is fixed approximately parallel to the recording medium P on both sides of the head carriage 2.

To adjust the illumination of the ink outlet as described above, it is effective to protect the entire recording head 3 against light. It is also effective to ensure that the distance h2 from the ink outlet 31 to recording medium P is smaller than the distance h1 from the irradiation means 4 to recording medium P (h1>h2), and to increase the distance d from the recording head 3 to the irradiation means 4. It is more preferred that a bellows structure 7 should be formed between the recording head 3 and irradiation means 4.

The wavelength of the ultraviolet rays applied by the irradiation means 4 can be adequately adjusted by replacing the ultraviolet ray lamp or filter arranged on the irradiation means 4.

The ink of the present invention is characterized by excellent ink emission stability. It is particularly effective when a line head type recording apparatus is used for image formation.

FIG. 2 is a top view of another example of the structure of the major portions of an inkjet recording apparatus.

The inkjet recording apparatus shown in FIG. 2 is called a line head system. The head carriage 2 is fixedly provided with a plurality of recording heads 3 of various colors so as to cover the overall width of the recording medium P.

The irradiation means 4 is arranged on the downstream side of the head carriage 2 so as to cover the overall width of the recording medium P, in the similar manner.

In the aforementioned lien head system, the head carriage 2 and irradiation means 4 are fixed in position. Only the recording medium P is conveyed, and ink is emitted and cured, whereby an image is formed.

EXAMPLE

The following will provide a specific description with reference to embodiments of the present invention, without the embodiments of the prevent invention being restricted thereto.

<<Preparing the Activated Light Curable Inkjet Ink (Also Called "Ink" for Short>>

The following ink was prepared according to ink compositions shown in Tables 1 and 2:

The photo-polymerizable compound and dispersant of the type and quantity shown in Tables 1 and 2 were placed in a stainless steel beaker. While being heated on a hot plate having a temperature of 65° C., they were stirred, mixed and dissolved for one hour.

The pigments of the type and quantity shown in Tables 1 and 2 were added thereto, and the solution was then put together with 200 grams of zirconia beads having a diameter of 1 mm into a plastic bottle, which was stoppered tightly. After having been subjected to the step of dispersion by a paint shaker for 2 hours, the zirconia bead was removed and, a photo-initiator and sensitizer shown in the Table were added to this solution. Then the solution was stirred and mixed.

To protect a printer against paper jamming, a 0.8 µm-membrane filter was used to filter this solution, whereby ink was produced.

The MCR (Modular Compact Rheometer) 300 of Physica Inc. was used to measure the viscosity. The value is based on a shear speed of 1000 (l/s) at a temperature of 25° C.

The surface tension was obtained by measurement on a platinum plate, using a surface tension meter (A3) of Kyowa Kaimen Kagaku Co., Ltd.

TABLE 1

| Coloring material | | K *1 | C *2 | M *3 | Y *4 | W *5 | Lk *1 | Lc *2 | Lm *3 | Ly *4 |
|---|---|---|---|---|---|---|---|---|---|---|
| Ink composition 1 (for comparison), viscosity of each color 26 through 31 mPa·s (25° C.), surface tension of each color: 34 through 35 mN/m (25° C., KF-352 not added) → 25 through 26 mN/m (25° C., KF-352, 0.1% added) | | | | | | | | | | |
| Coloring material | | 4.0 | 4.0 | 5.0 | 5.0 | 5.0 | 1.0 | 1.0 | 1.3 | 1.3 |
| Photo-polymerizable compound (alicyclic epoxy compound) | Celloxide 2021P (Daicel Chemical Industries, Ltd.) | 23.9 | 15.9 | 14.9 | 14.9 | 24.9 | 18.9 | 18.9 | 18.7 | 18.7 |
| Photo-polymerizable compound (epoxidized linseed oil) | Vikoflex9040 (ATOFINA) | 15.0 | 15.0 | 15.0 | 15.0 | 15.0 | 15.0 | 15.0 | 15.0 | 15.0 |
| Photo-polymerizable compound (oxetane compound) | OCT-211 Toa Gosei Co., Ltd. | 50.0 | 60.0 | 60.0 | 60.0 | 50.0 | 60.0 | 60.0 | 60.0 | 60.0 |
| Modified silicone oil | KF-352 (Shinetsu Silicone) | 0.1 | 0.1 | 0.1 | 0.1 | 0.1 | 0.1 | 0.1 | 0.1 | 0.1 |
| Photooxygenation agent | UVI6992 (Dow Chemical Inc.) | 5.0 | 3.0 | 3.0 | 3.0 | 3.0 | 3.0 | 3.0 | 3.0 | 3.0 |
| Dispersant | PB822 (Ajinomoto Fine Techno Co., Ltd.) | 2.0 | 2.0 | 2.0 | 2.0 | 2.0 | 2.0 | 2.0 | 2.0 | 2.0 |
| Ink composition 2 (present invention), viscosity of each color 28 through 31 mPa·s (25° C.), surface tension of each color: 29 through 30 mN/m (25° C., SDX-1843 not added) → 29 through 30 mN/m (25° C., SDX-1843, 0.1% added) | | | | | | | | | | |
| Coloring material | | 4.0 | 4.0 | 5.0 | 5.0 | 5.0 | 1.0 | 1.0 | 1.3 | 1.3 |
| Photo-polymerizable compound | Laurylacrylate (monofunctional) | 23.4 | 23.4 | 22.4 | 22.4 | 22.4 | 26.4 | 26.4 | 26.2 | 26.2 |
| Photo-polymerizable compound | Tetraethylene glycol diacrylate (bifunctional) | 25.0 | 25.0 | 25.0 | 25.0 | 25.0 | 25.0 | 25.0 | 25.0 | 25.0 |
| Photo-polymerizable compound | Caprolactam modified dipentaerithritol hexaacrylate (hexafunctional) | 35.0 | 35.0 | 35.0 | 35.0 | 35.0 | 35.0 | 35.0 | 35.0 | 35.0 |
| Modified silicone oil | SDX-1843 (Asahi Denka Kogyo K.K.) | 0.10 | 0.10 | 0.10 | 0.10 | 0.10 | 0.10 | 0.10 | 0.10 | 0.10 |
| Photoradical initiator | Irgacure 184 (Chiba Specialty Chemicals Inc.) | 2.50 | 2.50 | 2.50 | 2.50 | 2.50 | 2.50 | 2.50 | 2.50 | 2.50 |
| Photoradical initiator | Irgacure 369 (Chiba Specialty Chemicals Inc.) | 3.00 | 3.00 | 3.00 | 3.00 | 3.00 | 3.00 | 3.00 | 3.00 | 3.00 |
| Photooxygenation agent, propylene carbonate, 50% solution, formula (1) | UVI6992 (Dow Chemical Inc.) | 5.0 | 5.0 | 5.0 | 5.0 | 5.0 | 5.0 | 5.0 | 5.0 | 5.0 |
| Dispersant | PB822 (Ajinomoto Fine Techno Co., Ltd.) | 2.0 | 2.0 | 2.0 | 2.0 | 2.0 | 2.0 | 2.0 | 2.0 | 2.0 |
| Ink composition 3 (present invention), viscosity of each color 24 through 27 mPa·s (25° C.), surface tension of each color: 34 through 35 mN/m (25° C., XF412-334 not added) → 34 through 35 mN/m (25° C., XF42-334, 0.1% added) | | | | | | | | | | |
| Coloring material | | 4.0 | 4.0 | 5.0 | 5.0 | 5.0 | 1.0 | 1.0 | 1.3 | 1.3 |
| Photo-polymerizable compound (epoxidized linseed oil) | Vikoflex9040 (ATOFINA) | 8.0 | 8.0 | 8.0 | 8.0 | 8.0 | 8.0 | 8.0 | 8.0 | 8.0 |
| Photo-polymerizable compound (alicyclic epoxy compound) | Celloxide 2021P (Daicel Chemical Industries, Ltd.) | 30.0 | 30.0 | 30.0 | 30.0 | 30.0 | 30.0 | 30.0 | 30.0 | 30.0 |
| Photo-polymerizable compound (oxetane compound) | OXT-221 (Toa Gosei Co., Ltd.) | 40.8 | 40.8 | 39.8 | 39.8 | 39.8 | 43.8 | 43.8 | 43.6 | 43.6 |
| Photo-polymerizable compound (oxetane compound) | OXT-212 (Toa Gosei Co., Ltd.) | 10.0 | 10.0 | 10.0 | 10.0 | 10.0 | 10.0 | 10.0 | 10.0 | 10.0 |
| Basic compound | N-ethyldiethanol amine | 0.1 | 0.1 | 0.1 | 0.1 | 0.1 | 0.1 | 0.1 | 0.1 | 0.1 |
| Modified silicone oil | XF42-334 (G.E. Toshiba Silicone) | 0.10 | 0.10 | 0.10 | 0.10 | 0.10 | 0.10 | 0.10 | 0.10 | 0.10 |
| Photooxygenation agent | UVI6992 (Dow Chemical Inc.) | 5.0 | 5.0 | 5.0 | 5.0 | 5.0 | 5.0 | 5.0 | 5.0 | 5.0 |
| Dispersant | PB822 (Ajinomoto Fine Techno Co., Ltd.) | 2.0 | 2.0 | 2.0 | 2.0 | 2.0 | 2.0 | 2.0 | 2.0 | 2.0 |

*1: CI pigment Black 7
*2: CI pigment Blue 15:3
*3: pigment Red 57:1
*4: CI pigment Yellow 13
*5. Titanium oxide (anatase type: particle size: 0.2 μm)

TABLE 2

| Coloring material | | K *1 | C *2 | M *3 | Y *4 | W *5 |
|---|---|---|---|---|---|---|
| Ink composition 4 (present invention), viscosity of each color 22 through 25 mPa·s (25° C.), surface tension of each color: 33 through 35 mN/m (25° C., DC 57 additive not added) → 24 through 26 mN/m (25° C., DC 57, 0.1% added) | | | | | | |
| Coloring material | | 4.0 | 4.0 | 5.0 | 5.0 | 5.0 |
| Photo-polymerizable compound (alicyclic epoxy compound) | Celloxide 3000 (Daicel Chemical Industries, Ltd.) | 28.8 | 18.8 | 17.8 | 17.8 | 27.8 |
| Photo-polymerizable compound (epoxidized soybean oil) | Vikoflex7170 (ATOFINA) | 10.0 | 10.0 | 10.0 | 10.0 | 10.0 |
| Photo-polymerizable compound (oxetane compound) | OXT-221 (Toa Gosei Co., Ltd.) | 40.0 | 50.0 | 50.0 | 50.0 | 40.0 |
| Photo-polymerizable compound (oxetane compound) | OXT-211 (Toa Gosei Co., Ltd.) | 10.0 | 10.0 | 10.0 | 10.0 | 10.0 |
| Modified silicone oil | DC 57 Additive (Dow Coning Inc.) | 0.1 | 0.1 | 0.1 | 0.1 | 0.1 |
| Basic compound | Tributylamine | 0.1 | 0.1 | 0.1 | 0.1 | 0.1 |
| Photooxygenation agent. Propylene carbonate, 50% solution, Formula (1) | UV16976 (Dow Chemical) | 5.0 | 5.0 | 5.0 | 5.0 | 5.0 |
| Dispersant | PB822 (Ajinomoto Fine Techno Co., Ltd.) | 2.0 | 2.0 | 2.0 | 2.0 | 2.0 |
| Ink composition 5 (present invention), viscosity of each color 24 through 28 mPa·s (25° C.), surface tension of each color: 33 through 34 mN/m (25° C., SDX-1843 not added) → 33 through 34 mN/m (25° C., SDX-1843, 0.1% added) | | | | | | |
| Coloring material | | 4.0 | 4.0 | 5.0 | 5.0 | 5.0 |
| Photo-polymerizable compound (alicyclic epoxy compound) | Celloxide 3000 (Daicel Chemical Industries, Ltd.) | 29.8 | 34.8 | 33.8 | 33.8 | |
| Photo-polymerizable compound (epoxidized soybean oil) | Vikoflex7170 (ATOFINA) | 10.0 | 10.0 | 10.0 | 10.0 | 10.0 |
| Photo-polymerizable compound (oxetane compound) | OXT-221 (Toa Gosei Co., Ltd.) | 40.0 | 35.0 | 35.0 | 35.0 | 40.0 |
| Photo-polymerizable compound (oxetane compound) | OXT-211 (Toa Gosei Co., Ltd.) | 10.0 | 10.0 | 10.0 | 10.0 | 10.0 |
| Modified silicone oil | SDX-1843 (Asahi Denka Kogyo K.K.) | 0.1 | 0.1 | 0.1 | 0.1 | 0.1 |
| Basic compound | Tributylamine | 0.10 | 0.10 | 0.10 | 0.10 | 0.10 |
| Photooxygenation agent | S-1 | 4.0 | 4.0 | 4.0 | 4.0 | 4.0 |
| Dispersant | PB822 (Ajinomoto Fine Techno Co., Ltd.) | 2.0 | 2.0 | 2.0 | 2.0 | 2.0 |
| Ink composition 6 (present invention), viscosity of each color 26 through 30 mPa·s (25° C.), surface tension of each color: 34 through 35 mN/m (25° C., XF42-334 not added) → 34 through 35 mN/m (25° C., XF42-334, 0.1% added) | | | | | | |
| Coloring material | | 4.0 | 4.0 | 5.0 | 5.0 | 5.0 |
| Photo-polymerizable compound (oxetane compound) | OXT-221 (Toa Gosei Co., Ltd.) | 43.8 | 43.8 | 42.8 | 42.8 | 42.8 |
| Photo-polymerizable compound (oxetane compound) | OXT-212 (Toa Gosei Co., Ltd.) | 10.0 | 10.0 | 10.0 | 10.0 | 10.0 |
| Photo-polymerizable compound (epoxidized aliphatic butyl) | E-4030 (Dhinnippon Rika Co., Ltd.) | 10.0 | 10.0 | 10.0 | 10.0 | 10.0 |
| Photo-polymerizable compound (alicyclic epoxy compound) | EP-1 | 25.0 | 25.0 | 25.0 | 25.0 | 25.0 |
| Basic compound | Triisopropanol amine | 0.1 | 0.1 | 0.1 | 0.1 | 0.1 |
| Modified silicone oil | XF42-334 (G.E. Toshiba Silicone) | 0.10 | 0.10 | 0.10 | 0.10 | 0.10 |

TABLE 2-continued

| Coloring material | | K *1 | C *2 | M *3 | Y *4 | W *5 |
|---|---|---|---|---|---|---|
| Photooxygenation agent | S-2 | 5.0 | 5.0 | 5.0 | 5.0 | 5.0 |
| Dispersant | PB822 (Ajinomoto Fine Techno Co., Ltd.) | 2.0 | 2.0 | 2.0 | 2.0 | 2.0 |

*1: CI pigment Black 7
*2: CI pigment Blue 15:3
*3: CI pigment Red 57:1
*4: CI pigment Yellow 13
*5. Titanium oxide (anatase type: particle size: 0.2 μm)

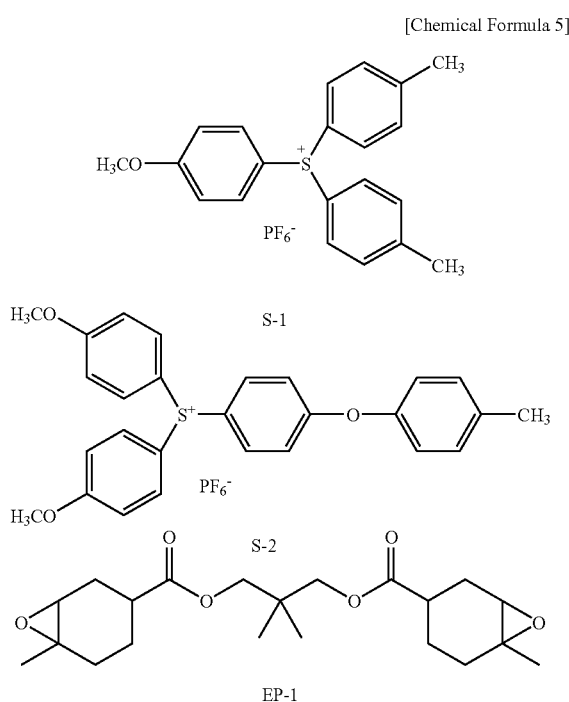

[Chemical Formula 5]

<<Inkjet Image Formation Method>>

Ink sets 1 through 3 prepared according to the aforementioned procedure were loaded on to the inkjet recording apparatus of the configuration shown in FIG. 1 comprising a piezo inkjet nozzle. The following image recording was performed onto the long recording medium having a width of 600 mm and a length of 500 m shown in Table 3. The ink supply system comprised an ink tank, a supply pipe, an ante-chamber ink tank located immediately before the head, a filtered pipe and a piezo head. Heat insulation was provided from the ante-chamber tank to the head portion, and heat was applied at a temperature of 50° C. The piezo head was driven so as to emit 2 through 15 pl multi-sized dots at a resolution of 720×720 dpi, and inks were emitted on a continuous basis. Upon arrival of the inks, inks were cured immediately (less than 2 sec. after arrival of inks) by the lamp unit on both sides of the carriage. After recording, the total ink film thickness was measured; it was within the range from 2.3 through 13 μm. The "dpi" in the sense in which it is used here refers to the number of dots per 2.54 cm. Inkjet image formation was carried out according to the aforementioned procedure at 10° C. with a relative humidity of 20% RH, at 25° C. with a relative humidity of 50% RH and at 28° C. with a relative humidity of 80% RH. Then the following evaluation was made at 1 m, 10 m and 100 m.

In identically the same manner, the platen section was heated by a heat plate at 40° C. using the line head recording type injection recording apparatus shown in FIG. 2, and ink sets 4 through 6 were used to form an image.

The following describes the details of the abbreviations for the recording media shown in Table 3:

Yupo FGS (Tradename by Yupo Inc,)
PET: polyethylene terephthalate
PVC: polyvinyl chloride

TABLE 3

| Sample No. | Ink | Recording medium | Surface energy (dyn/cm) | Beck smooth-ness | Surface roughness Rz | Irradiation source | Timing for irradiation | Method of irradiation (area) | Illumination measured by UVPF-A1 (by Iwasaki Denki Co., Ltd.) The maximum illumination and peak wavelength on recording medium surface | Remarks |
|---|---|---|---|---|---|---|---|---|---|---|
| | | | | | | Irradiation conditions | | | | |
| 1 | Ink composition 1 | Yupo FGS | 38 | 400 sec | 3 μm | *1 | 0.1 sec. after arrival of ink | *3 | 400 mW/cm² at 365 nm | Comp. |

TABLE 3-continued

| Sample No. | Ink | Recording medium | Surface energy (dyn/cm) | Beck smoothness | Surface roughness Rz | Irradiation conditions | | | Illumination measured by UVPF-A1 (by Iwasaki Denki Co., Ltd.) The maximum illumination and peak wavelength on recording medium surface | Remarks |
|---|---|---|---|---|---|---|---|---|---|---|
| | | | | | | Irradiation source | Timing for irradiation | Method of irradiation (area) | | |
| 2 | Ink composition 1 | PET | 53 | 600 sec | 2 μm | *1 | 0.1 sec. after arrival of ink | *3 | 400 mW/cm² at 365 nm | Comp. |
| 3 | Ink composition 1 | PVC | 39 | 600 sec | 2 μm | *1 | 0.1 sec. after arrival of ink | *3 | 400 mW/cm² at 365 nm | Comp. |
| 4 | Ink composition 1 | Art paper | Absorption type recording medium | 360 sec | 5 μm | *1 | 0.1 sec. after arrival of ink | *3 | 400 mW/cm² at 365 nm | Comp. |
| 5 | Ink composition 1 | Non-coated paper | | 70 sec | 16 μm | *1 | 0.1 sec. after arrival of ink | *3 | 400 mW/cm² at 365 nm | Comp. |
| 6 | Ink composition 2 | Yupo FGS | 38 | 400 sec | 3 μm | *1 | 0.1 sec. after arrival of ink | *3 | 400 mW/cm² at 365 nm | Inv. |
| 7 | Ink Composition 2 | PET | 53 | 600 sec | 2 μm | *1 | 0.1 sec. after arrival of ink | *3 | 400 mW/cm² at 365 nm | Inv. |
| 8 | Ink Composition 2 | PVC | 39 | 600 sec | 2 μm | *1 | 0.1 sec. after arrival of ink | *3 | 400 mW/cm² at 365 nm | Inv. |
| 9 | Ink Composition 2 | Art paper | Absorption type recording medium | 360 sec | 5 μm | *1 | 0.1 sec. after arrival of ink | *3 | 400 mW/cm² at 365 nm | Inv. |
| 10 | Ink Composition 2 | Non-coated paper | | 70 sec | 16 μm | *1 | 0.1 sec. after arrival of ink | *3 | 400 mW/cm² at 365 nm | Inv. |
| 11 | Ink Composition 3 | Yupo FGS | 38 | 400 sec | 3 μm | *1 | 0.1 sec. after arrival of ink | *3 | 400 mW/cm² at 365 nm | Inv. |
| 12 | Ink Composition 3 | PET | 53 | 600 sec | 2 μm | *1 | 0.1 sec. after arrival of ink | *3 | 400 mW/cm² at 365 nm | Inv. |
| 13 | Ink Composition 3 | PVC | 39 | 600 sec | 2 μm | *1 | 0.1 sec. after arrival of ink | *3 | 400 mW/cm² at 365 nm | Inv. |
| 14 | Ink Composition 3 | Art paper | Absorption type recording medium | 360 sec | 5 μm | *1 | 0.1 sec. after arrival of ink | *3 | 400 mW/cm² at 365 nm | Inv. |
| 15 | Ink composition 3 | Non-coated paper | | 70 sec | 16 μm | *1 | 0.1 sec. after arrival of ink | *3 | 400 mW/cm² at 365 nm | Inv. |
| 16 | Ink Composition 4 | Yupo FGS | 38 | 400 sec | 3 μm | *2 | 0.1 sec. after arrival of ink | *4 | 120 mW/cm² at 254 nm | Comp. |
| 17 | Ink Composition 4 | PET | 53 | 600 sec | 2 μm | *2 | 0.1 sec. after arrival of ink | *4 | 120 mW/cm² at 254 nm | Comp. |

TABLE 3-continued

| Sample No. | Ink | Recording medium | Surface energy (dyn/cm) | Beck smoothness | Surface roughness Rz | Irradiation conditions | | | Illumination measured by UVPF-A1 (by Iwasaki Denki Co., Ltd.) The maximum illumination and peak wavelength on recording medium surface | Remarks |
|---|---|---|---|---|---|---|---|---|---|---|
| | | | | | | Irradiation source | Timing for irradiation | Method of irradiation (area) | | |
| 18 | Ink Composition 4 | PVC | 39 | 600 sec | 2 μm | *2 | 0.1 sec. after arrival of ink | *4 | 120 mW/cm² at 254 nm | Comp. |
| 19 | Ink Composition 4 | Art paper | Absorption type recording medium | 360 sec | 5 μm | *2 | 0.1 sec. after arrival of ink | *4 | 120 mW/cm² at 254 nm | Comp. |
| 20 | Ink Composition 4 | Non-coated paper | | 70 sec | 16 μm | *2 | 0.1 sec. after arrival of ink | *4 | 120 mW/cm² at 254 nm | Comp. |
| 21 | Ink Composition 5 | Yupo FGS | 38 | 400 sec | 3 μm | *2 | 0.1 sec. after arrival of ink | *4 | 120 mW/cm² at 254 nm | Inv. |
| 22 | Ink Composition 5 | PET | 53 | 600 sec | 2 μm | *2 | 0.1 sec. after arrival of ink | *4 | 120 mW/cm² at 254 nm | Inv. |
| 23 | Ink Composition 5 | PVC | 39 | 600 sec | 2 μm | *2 | 0.1 sec. after arrival of ink | *4 | 120 mW/cm² at 254 nm | Inv. |
| 24 | Ink Composition 5 | Art paper | Absorption type recording medium | 360 sec | 5 μm | *2 | 0.1 sec. after arrival of ink | *4 | 120 mW/cm² at 254 nm | Inv. |
| 25 | Ink Composition 5 | Non-coated paper | | 70 sec | 16 μm | *2 | 0.1 sec. after arrival of ink | *4 | 120 mW/cm² at 254 nm | Inv. |
| 26 | Ink Composition 6 | Yupo FGS | 38 | 400 sec | 3 μm | *2 | 0.1 sec. after arrival of ink | *4 | 120 mW/cm² at 254 nm | Inv. |
| 27 | Ink Composition 6 | PET | 53 | 600 sec | 2 μm | *2 | 0.1 sec. after arrival of ink | *4 | 120 mW/cm² at 254 nm | Inv. |
| 28 | Ink Composition 6 | PVC | 39 | 600 sec | 2 μm | *2 | 0.1 sec. after arrival of ink | *4 | 120 mW/cm² at 254 nm | Inv. |
| 29 | Ink Composition 6 | Art paper | Absorption type recording medium | 360 sec | 5 μm | *2 | 0.1 sec. after arrival of ink | *4 | 120 mW/cm² at 254 nm | Inv. |
| 30 | Ink Composition 6 | Non-coated paper | | 70 sec | 16 μm | *2 | 0.1 sec. after arrival of ink | *4 | 120 mW/cm² at 254 nm | Inv. |

*1. High voltage mercury lamp VZero085 (Integration Technology Inc.)
*2. Low voltage mercury lamp (a custom-designed product by Nippo): light source power consumption: less than 1 kW · hr
*3. A line light source is arranged on each sides of the recording head. FIG. 1
*4. Irradiation from the line light source downstream in the recording medium feed direction. FIG. 2
Inv.: Present invention,
Comp.: Comparison <<Evaluation of the Inkjet Recording Image>>

Each of the images recorded according to the aforementioned image formation method was evaluated as follows:

(Character Quality)

Using inks of Y, M, C and K colors, 6-point MS Mincho typeface characters were printed at the target density, and irregularities of characters were magnified and evaluated using a magnifier. Character quality was evaluated according to the following criteria:

A: No irregularities in characters
B: Slight irregularities in characters
C: Irregularities in characters observed. Characters identified. Applicable for practical purposes only with difficulty
D: Serious irregularities in characters, which are blurred. Unsuited for practical use (Color Mixture (Bleeding and Wrinkling))

Printing was performed at 720 dpi so that each dot of Y, M, C and K colors is adjacent to the others, and adjacent color dots were magnified by a magnifier for visual observation of bleeding. Color mixture was evaluated according to the following criteria:

A: Adjacent dots kept in a truly round shape, without bleeding.
B: Adjacent dots kept in an approximately round shape, almost without bleeding.
C: Adjacent dots slightly bleeding and deformed. Applicable for practical purposes only with difficulty.
D: Adjacent dots bleeding and mixed, with wrinkles observed in overlapped portions. Unsuited for practical use Table 4 shows the result of the aforementioned evaluation:

TABLE 4

| Sample No. | 10° C. 20% RH | | | | | | 25° C. 50% RH | | | | | | 28° C. 80% RH | | | | | | Remarks |
|---|---|---|---|---|---|---|---|---|---|---|---|---|---|---|---|---|---|---|---|
| | 1 m | | 10 m | | 100 m | | 1 m | | 10 m | | 100 m | | 1 m | | 10 m | | 100 m | | |
| | *1 | *2 | *1 | *2 | *1 | *2 | *1 | *2 | *1 | *2 | *1 | *2 | *1 | *2 | *1 | *2 | *1 | *2 | |
| 1 | B | B | C | C | E | E | B | B | E | E | E | E | B | B | E | E | E | E | Comp. |
| 2 | B | B | C | B | C | C | B | B | C | C | E | E | B | B | C | C | E | E | Comp. |
| 3 | B | B | C | C | E | E | B | B | C | C | E | E | B | B | E | E | E | E | Comp. |
| 4 | B | B | C | C | E | E | B | B | E | E | E | E | B | B | E | E | E | E | Comp. |
| 5 | C | C | E | E | E | E | C | C | E | E | E | E | E | E | E | E | E | E | Comp. |
| 6 | B | C | B | C | B | C | B | C | B | C | B | C | B | C | B | C | B | C | Inv. |
| 7 | B | B | B | B | B | B | B | B | B | B | B | B | B | B | B | B | B | B | Inv. |
| 8 | B | B | B | B | B | B | B | B | B | B | B | B | B | B | B | B | B | B | Inv. |
| 9 | B | B | C | B | C | C | B | B | C | B | C | C | B | B | C | B | C | C | Inv. |
| 10 | B | B | B | B | C | C | B | B | C | C | C | C | B | B | C | C | C | C | Inv. |
| 11 | B | A | B | A | B | B | B | A | B | A | B | B | B | A | B | A | B | B | Inv. |
| 12 | A | B | A | B | A | B | A | B | A | B | A | B | A | B | A | B | A | B | Inv. |
| 13 | A | A | A | B | A | B | A | A | A | B | A | B | A | A | A | B | A | B | Inv. |
| 14 | A | A | A | A | A | A | A | A | A | A | A | A | A | A | A | A | A | A | Inv. |
| 15 | A | A | A | A | A | A | A | A | A | A | A | B | B | B | B | B | B | B | Inv. |
| 16 | B | B | C | C | E | E | B | B | C | C | E | E | B | B | E | E | E | E | Comp. |
| 17 | B | B | B | B | C | C | B | B | C | B | E | E | B | B | E | E | E | E | Comp. |
| 18 | B | B | B | B | E | E | B | B | C | C | E | E | B | B | E | E | E | E | Comp. |
| 19 | B | B | C | C | E | E | B | B | C | C | E | E | B | B | E | E | E | E | Comp. |
| 20 | C | C | E | E | E | E | C | C | E | E | E | E | E | E | E | E | E | E | Comp. |
| 21 | B | B | B | B | B | B | B | B | B | B | B | B | C | C | C | C | C | C | Inv. |
| 22 | B | B | B | B | B | B | B | B | B | B | B | B | B | B | B | B | B | B | Inv. |
| 23 | B | B | B | B | B | B | B | B | B | B | B | B | B | B | B | B | B | B | Inv. |
| 24 | B | B | B | B | B | B | B | B | B | B | B | B | C | C | C | C | C | C | Inv. |
| 25 | B | B | B | B | B | B | B | B | B | C | C | C | C | C | C | C | C | C | Inv. |
| 26 | B | A | B | A | B | A | B | B | B | B | B | B | B | B | B | B | B | B | Inv. |
| 27 | A | B | A | B | A | B | A | B | A | B | A | B | B | B | B | B | B | B | Inv. |
| 28 | B | A | B | A | B | A | B | A | B | A | B | A | B | B | B | B | B | B | Inv. |
| 29 | A | A | A | A | A | A | A | A | A | A | A | B | B | B | B | B | B | B | Inv. |
| 30 | A | A | A | A | A | A | A | A | A | B | B | B | B | B | B | B | B | B | Inv. |

*1. Character quality:
*2. Color mixture (bleeding and wrinkling)
Comp.: Comparison,
Inv.: Present invention The configuration of the present invention ensures allows a high-definition image to be formed with great stability.

What is claimed is:

1. An active light curable inkjet ink comprising:
   a photo-initiator;
   a photo-polymerizable compound;
   a dispersant; and
   a modified silicone oil,
   wherein
   a content of the modified silicone oil is 0.01 through 1.0 percent by mass based on the total weight of the active light curable inkjet ink; and
   the active light curable inkjet ink has a surface tension of 30 through 45 mN/m at 25° C., and
   wherein the modified silicone oil has the following effect: when the modified silicone oil is added in an amount of 0.1 percent by mass to an inkjet ink composition which has been prepared by removing the modified silicone oil from the active light curable inkjet ink, a surface tension of the inkjet ink composition at 25° C. is reduced by 0 through 3 mN/m.

2. The active light curable inkjet ink of claim 1, wherein the photo-polymerizable compound comprises an oxirane group.

3. The active light curable inkjet ink of claim 1, wherein the photo-polymerizable compound comprises:

30 through 95 percent by mass of a compound containing an oxetane ring;

5 through 70 percent by mass of a compound containing an oxirane; and 0 through 40 percent by mass of a vinyl ether compound.

4. The active light curable inkjet ink of claim 1, wherein a viscosity of the active light curable inkjet ink at 25° C. is 7 through 50 mPa·s.

5. The active light curable inkjet ink of claim 1, further comprising a pigment.

6. An image formation method comprising the steps of:

printing on a recording medium by jetting the active light curable inkjet ink of claim 1 onto the recording medium from an inkjet recording head; and applying active light 0.001 through 2.0 sec. after arrival of the active light curable inkjet ink.

7. The image formation method of claim 6, further comprising a step of heating the active light curable inkjet ink and the recording head to 35 through 100° C.

* * * * *